(12) United States Patent
Zhang

(10) Patent No.: US 10,986,669 B2
(45) Date of Patent: Apr. 20, 2021

(54) PHYSICAL RANDOM ACCESS CHANNEL SCHEME FOR WIRELESS NETWORKS USING AN ANALOG BLOOM FILTER

(71) Applicant: The Florida State University Research Foundation, Inc., Tallahassee, FL (US)

(72) Inventor: Zhenghao Zhang, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 16/413,178

(22) Filed: May 15, 2019

(65) Prior Publication Data

US 2019/0357259 A1 Nov. 21, 2019

Related U.S. Application Data

(60) Provisional application No. 62/671,719, filed on May 15, 2018.

(51) Int. Cl.
*H04W 74/08* (2009.01)
(52) U.S. Cl.
CPC .............................. *H04W 74/0833* (2013.01)
(58) Field of Classification Search
CPC ........ H04L 5/00; H04L 5/26; H04W 74/0833; H04B 7/2615; H04J 4/00
USPC ....................................................... 370/330
See application file for complete search history.

(56) References Cited

U.S. PATENT DOCUMENTS

2015/0365977 A1\* 12/2015 Tabet ................ H04W 72/0406
370/330
2020/0037345 A1\* 1/2020 Ryoo ................ H04W 72/1268

OTHER PUBLICATIONS

Zhenghao Zhang, Supporting Multi-bit Simultaneous Query in wireless with Coherent Analog Bloom Filter, IEEE Xplore (Year: 2017).\*

\* cited by examiner

*Primary Examiner* — Robert J Lopata
(74) *Attorney, Agent, or Firm* — Eversheds Sutherland (US) LLP

(57) ABSTRACT

This disclosure describes a novel PRACH scheme based on an Analog Bloom Filter, in which user equipment is allowed to transmit multiple sequences to a base station, instead of only one sequence as is the case with the current LTE. A new decoding algorithm is disclosed, which copes with the unique challenges in the signal generated with ZC sequences, such as peak shifting and multiple peaks. In addition, when CFO can be removed the new scheme allows the UE to piggyback $\log_2 7$ bits of information along with the signal. Evaluation shows that the new scheme outperforms the existing PRACH of LTE by more than an order of magnitude in many cases, and therefore is a good candidate as the PRACH for future wireless networks (e.g., 5G).

20 Claims, 7 Drawing Sheets

PHYSICAL RANDOM ACCESS CHANNEL SCHEME FOR WIRELESS NETWORKS USING AN ANALOG BLOOM FILTER

CROSS-REFERENCE TO RELATED APPLICATIONS

This application claims the benefit of U.S. Provisional Application 62/671,719, filed on May 15, 2018, the disclosure of which is incorporated herein by reference as if set forth in full.

GOVERNMENT LICENSE RIGHTS

This invention was made with government support under "CAREER: Addressing Fundamental Challenges for Wireless Coverage Service in the TV White Space" (Award Number: 1149344) awarded by the National Science Foundation. The government has certain rights in the invention.

TECHNICAL FIELD

This disclosure generally relates to systems and methods for wireless communications and, more particularly, to a physical random access channel (PRACH) scheme for wireless networks using an analog Bloom filter (ABF).

BACKGROUND

In wireless communications, 5G is expected to far outperform the current Long-Term Evolution (LTE) 4G communications standard in user density, latency, and speed. Physical random access channel (PRACH) is a procedure with which a user equipment (UE) may initiate a connection with a base station, also referred to as a gNB. In the current LTE networks, each base station has up to 64 orthogonal Zadoff-Chu (ZC) sequences, and a UE randomly picks a sequence to transmit on the PRACH channel. A Zadoff-Chu sequence may be a sequence characterized by a constant amplitude and may also have the property that cyclically shifted versions of the sequence are orthogonal. As the number of sequences is limited, the probability of collision (e.g., two UEs picked a same sequence) is high. For example, with four active UEs, the collision probability may be about 0.09. With far more devices to support in future wireless networks (e.g., 5G), new designs of PRACH may be needed.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

Figure 1:
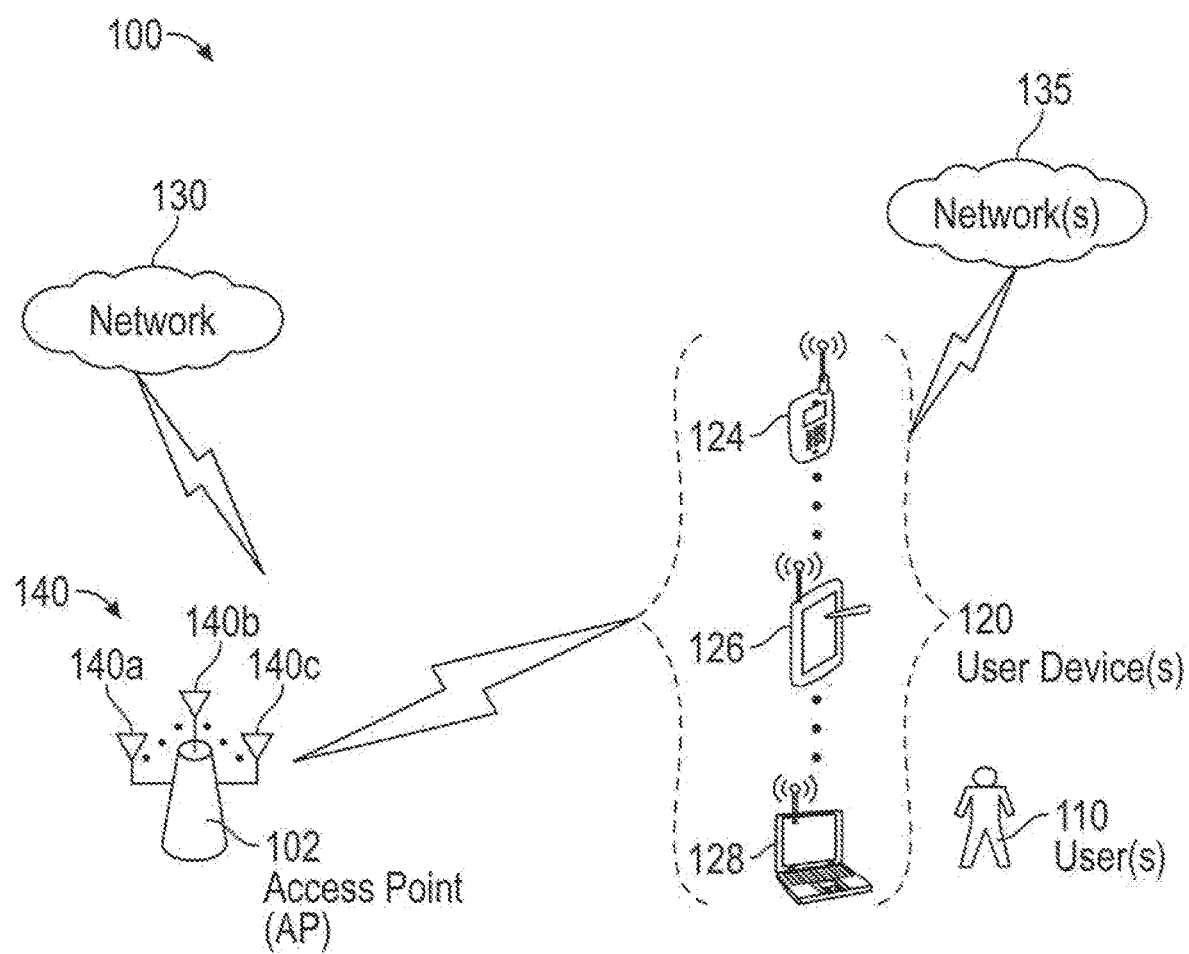
FIG. 1 depicts a network diagram illustrating an example network environment for a physical random access channel (PRACH) scheme for wireless networks (e.g., 5G) using an Analog Bloom Filter (ABF) in accordance with one or more example embodiments of the disclosure.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

Example embodiments described herein provide certain systems, methods, and devices for a physical random access channel (PRACH) scheme for wireless networks (e.g., 5G) using an Analog Bloom Filter (ABF). The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless networks, such as 5G, are expected to support far higher user density and far lower latency than LTE. PRACH is an important procedure for a User Equipment (UE), which, in some cases, maybe used initiate a connection with the base station. In this disclosure, a novel PRACH scheme is disclosed, which may outperform the current LTE PRACH in many cases by an order of magnitude measured by a total error ratio. In some instances, the total error ratio may be defined broadly as the total number of errors divided by the number of times the PRACH procedure is performed. The errors may include: False Positive errors, i.e., an idle UE is identified as active; False Negative errors, i.e., an active UE is identified as idle; and collision, i.e., two or more active UEs transmit the same signal and cannot be identified. The new scheme is based on the Analog Bloom Filter (ABF), with which a UE may transmit multiple orthogonal sequences to a base station, instead of only one sequence according to LTE. The collision probability may thus be greatly reduced because the number of combinations of sequences may be much larger than the number of sequences. The challenges addressed in this disclosure may include at least devising a signal processing algorithm (e.g., decoding algorithm) that can cope with issues associated with implementing an ABF based on the ZC sequence, such as peak shift, side peaks, and peak energy spreading, for example. In addition, a scheme may be designed that allows the UE to piggyback multiple bits along with the PRACH signal, in the case that the UE estimates and removes the Carrier Frequency Offset (CFO), which may occur, for example, when an oscillator signal in a the receiver does not synchronize with the carrier signal of a received signal.

In some embodiments, the new PRACH scheme may be referred to as Peak-based Analog Bloom Filter (PABF), where a peak may be the signal observed for a transmitted sequence. The PABF may allow a UE to transmit not just one sequence, but multiple sequences, where the set of sequences may be referred to as a pattern. As the number of patterns to choose from, e.g., 2304 with the current design, may be far more than the number of sequences, the collision probability may be greatly reduced. In addition, PABF may modulate $$\log_2 7$$

bits of information on the sequences, which may be used to further improve network efficiency. An evaluation performed using the disclosure provided herein may show that PABF outperforms LTE PRACH by around at least an order of magnitude in many cases, and the message error ratio may be very low.

In some embodiments, PABF may result in lower collision probabilities than LTE PRACH. In some instances, PABF may also be associated with extremely low False Positive ratios, which may be shown in the simulation results presented below. This may happen because PABF may attribute the peaks generated by a UE to the UE after the UE has been found to active, therefore idle UEs may eventually be left with no peaks, while a Digital Bloom Filter does not attempt to attribute a bit to any node (e.g. peak to a UE). PABF may be based on a ZC sequence, which may have the benefit of robustness under very low Signal to Noise Ratios (SNR), but also may present many unique challenges, including at least the shift of the peaks, and the spread of energy from a peak to nearby locations. Random access solutions based on a Bloom filter have been proposed for LTE networks, however, this solution may require the UE to transmit a signal over multiple Random Access Opportunity (RAO). PABF may provide the benefit that UEs may transmit only in one RAO, and therefore, PABF may have much lower latency. To achieve this, PABF may generate different physical layer signals and addresses many challenges in the signal processing level.

In some embodiments, a base station may be assigned a ZC root sequence (a ZC sequence that may not have been shifted), denoted as $\Lambda$, which may be a complex vector of length H, where H may be a length of 839. The ZC sequence may have the property that a cyclic shift of $\Lambda$ is orthogonal to all other cyclic shifts (that is, all cyclic shifts may be orthogonal to one another). In this disclosure, any cyclically shifted version of $\Lambda$ may be called a sequence, and may be denoted as $\Lambda_h$, if the shift is h locations. An active UE may transmit one or more sequences on the 839 subcarriers allocated for PRACH, which may have a subcarrier spacing of 1.25 KHz. An idle UE may not transmit any signal.

Although PABF may be based on ABF, the difference may be profound, because the original ABF was designed for Orthogonal Frequency-Division Multiplexing (OFDM) subcarriers. As previously mentioned, PABF may instead be designed for use with ZC sequences, which may present its own set of unique challenges. To be more specific, if a UE transmits on an OFDM subcarrier, its signal may only appear on the subcarrier. If a UE transmits a sequence $\Lambda_h$, only in the ideal case, the signal may have a peak precisely at point h. However, the channel may introduce changes to the peaks, such as, for example, peak shifting, multiple peaks, and/or energy spreading. Additionally, regarding the PABF UE identification process, at a high level, PABF may identify UEs based the relative distances between signal peaks. In contrast, the LTE PRACH may identify the UEs based on the observed peak locations, therefore the capacity may be heavily constrained by the maximum propagation delay because peaks may shift due to the delay.

Figure 2:
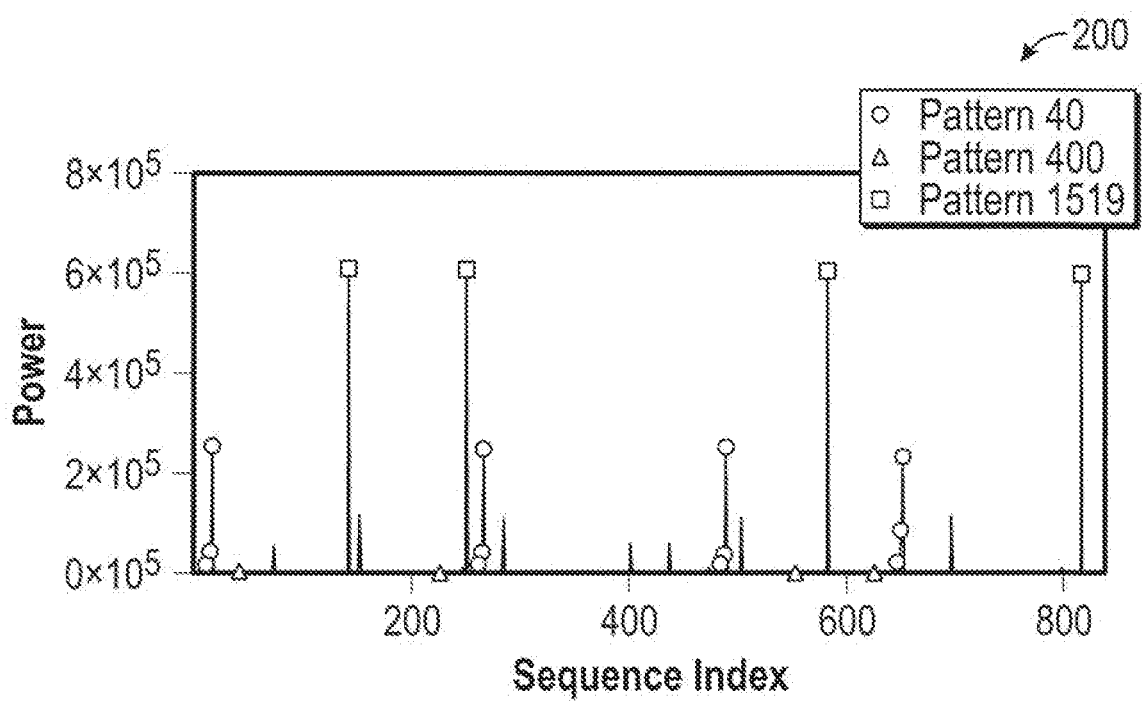
FIG. 2 depicts a graph showing a signal when there are multiple active UEs in accordance with one or more example embodiments of the disclosure.

In some embodiments, one such example change to the peaks includes peak shifting, where the peak location may be shifted because of propagation delay. With the current LTE network parameters, one microsecond delay may roughly correspond to a shift of 1 point (a point may refer to an index in a signal vector). For example, FIG. 2 shows the signal when there were multiple active UEs. UE 1519 may be assigned sequences {146, 254, 586, 820}; however, the actual peaks may be at {143, 251, 583, 817}. The gNB may not know beforehand the propagation delays of the UEs, therefore it may not know exactly where to expect a peak from a UE. Fortunately, the propagation delay may be bounded, and all peaks by the same UE may be shifted by the same amount. A CFO of one subcarrier spacing may also leads to a shift of 1 point, however, such shift may not be considered as the UE may perform CFO estimation and remove CFO larger than one subcarrier spacing. CFO less than one subcarrier spacing may still exist and is called fraction CFO (fCFO).

In some embodiments, the PRACH signal is used by the current LTE networks to estimate propagation delay, however, this may be a coarse-grained delay estimate. The coarse-grained delay estimate with PRACH based on ABF may be obtained based on the shift between the assigned peaks and observed peaks. In case the CFO can be estimated and removed, PRACH based on ABF may also support fine-grained in addition to the coarse-grained delay estimates capable with LTE PRACH. The additional step may be to identify clean peaks, and then use the signal from multiple clean peaks.

In some embodiments, the clean peaks may have been identified after a message decoding process is performed (e.g., as described below). However, unlike message decoding that needs at least two clean peaks, delay may be estimated with just one peak. Therefore, if two or more clean peaks have been found, they may be used also in delay estimation. Otherwise, among the peaks that were owned by the UE, the one that has the minimum collision count is used, where the collision count of any location is the number of peaks that are within a distance of 8.

In some embodiments, with continuing references to measuring propagation delay, after the set of usable peaks have been found, a delay estimation method may be used. In one embodiment, a coarse estimate may first be found by finding the amount of shift of the peak, which may be an integer and may be multiplied with $\epsilon$, which may denote the delay value corresponding to a shift of 1 location. To further obtain fine-grained estimate under $\epsilon$, 16 evenly spaced delay values from $[-\epsilon, \epsilon]$ may be used to generate the expected signal of a channel with a single path. For any single peak, the weight of a delay value may be calculated as the inner product of the received signal around the peak with the conjugate of the expected signal of that delay value. With multiple usable peaks and multiple antenna, the weight is summation of all peaks and all antennas. The delay value with the maximum weight may be used as the estimate.

In some embodiments, a third such example change involves the energy of a pure spike spreading and a peak appearing as a bell shape due to factors such as fCFO and Time Offset (Toff). In particular, any non-zero Toff may multiply a sinusoid with $Y_a$. If the sinusoid does not complete an integer number of cycles in the length of $Y_a$, it may not be a clean peak in $R_a$ after IFFT. For example, any peak by UE 1519, although fairly sharp, may still raise the energy levels of nearby points above the level of an active UE, UE 400. $Y_a$ is the complex vector received from antenna a, $R_a$ is the complex signal vector derived from $Y_a$ after signal processing involving IFFT which is an Inverse Fast Fourier Transform.

Due to these challenges, the PABF scheme disclosed herein may involve many unique aspects compared to the original ABF (e.g., in terms of the decoding algorithm used to process received signal vectors at a base station), such as friend-based peak assignment, belief propagation, and a fake peak removal process.

In some embodiments, when the CFO has been correctly estimated and completely removed, the messages are decoded only after the set of active UEs have been identified. As the decoding process is the same for all active UEs, it will be explained for only one UE.

First, the set of usable sequences among all K sequences may found. Only some sequences may be usable, because some sequence may be close to the sequences from other UEs and the signal may get distorted. The selection of usable sequences may be based on the fact that the clean sequences may look alike. Therefore, the algorithm first obtains 7 points of signal around each peak, and computes the normalized differences between all pairs of such 7-point vectors. Sequences with normalized differences less than 0.2 are considered similar, and maximum number of similar sequences that includes at least one sequence owned by the UE are found as the usable sequences. If there is only one usable sequence, the message is not decoded.

The decoding may involve a linear scan of all possible messages. For a message q, the signals of all usable sequences may be rotated, i.e., multiplied by the negative of the phases of message q. The cost of a message is the squared error of the rotated signals of all sequences to the mean of all rotated signals. The message with minimum cost may be selected as the output. If the minimum cost is greater than the half of the second smallest cost, the message may not be decoded.

In some embodiments, the decoding process (the process of decoding any signals received by UEs) may include at least following: peak finding and peak strengthening, peak assignment and initial screening, belief propagation, and fake peak removal.

In some embodiments, the first step of the decoding process may involve peak finding and peak strengthening. The list of peaks in the signal may be found by a peak finder algorithm. The peaks may also strengthened, i.e., for each peak, the fCFO and Toff may be estimated and compensated, which may serve to remove side lobes and makes the peak sharper.

In some embodiments, a second step of the decoding process may involve peak assignment and initial screening. For any UE, peaks close to the UE's sequences may be assigned to the UE. If a UE is active, it may be assigned peaks around all its sequences Otherwise, the UE may not have an assignment, and may be discarded.

In some embodiments, a third step of the decoding process may involve belief propagation. Through belief propagation, the set of UE that passed the initial screening may be processed based on an iterative belief propagation algorithm. This iterative algorithm may find the UE that receives maximum credits from a set of peaks, and mark that same UE as active if the total energy on those peaks is above a threshold. Such peaks are said to be owned by the UE and may be removed from the list of peaks.

In some embodiments, a fourth step of the decoding process may involve fake peak removal. After a UE is marked active, the signals near the peaks owned by the UE may be cleaned to remove fake peaks.

Example System and Associated Architecture

FIG. 1 is a network diagram illustrating an example network environment for a physical random access channel (PRACH) scheme for wireless networks (e.g., 5G) using an Analog Bloom Filter (ABF), according to some example embodiments of the present disclosure. Wireless network 100 may include one or more user device(s) 120 and one or more access point(s) (AP) (referred interchangeably herein as "base station," "gNB," or the like) 102, which may communicate in accordance with each other. The user device(s) 120 may be mobile devices that are non-stationary and do not have fixed locations.

Figure 11:
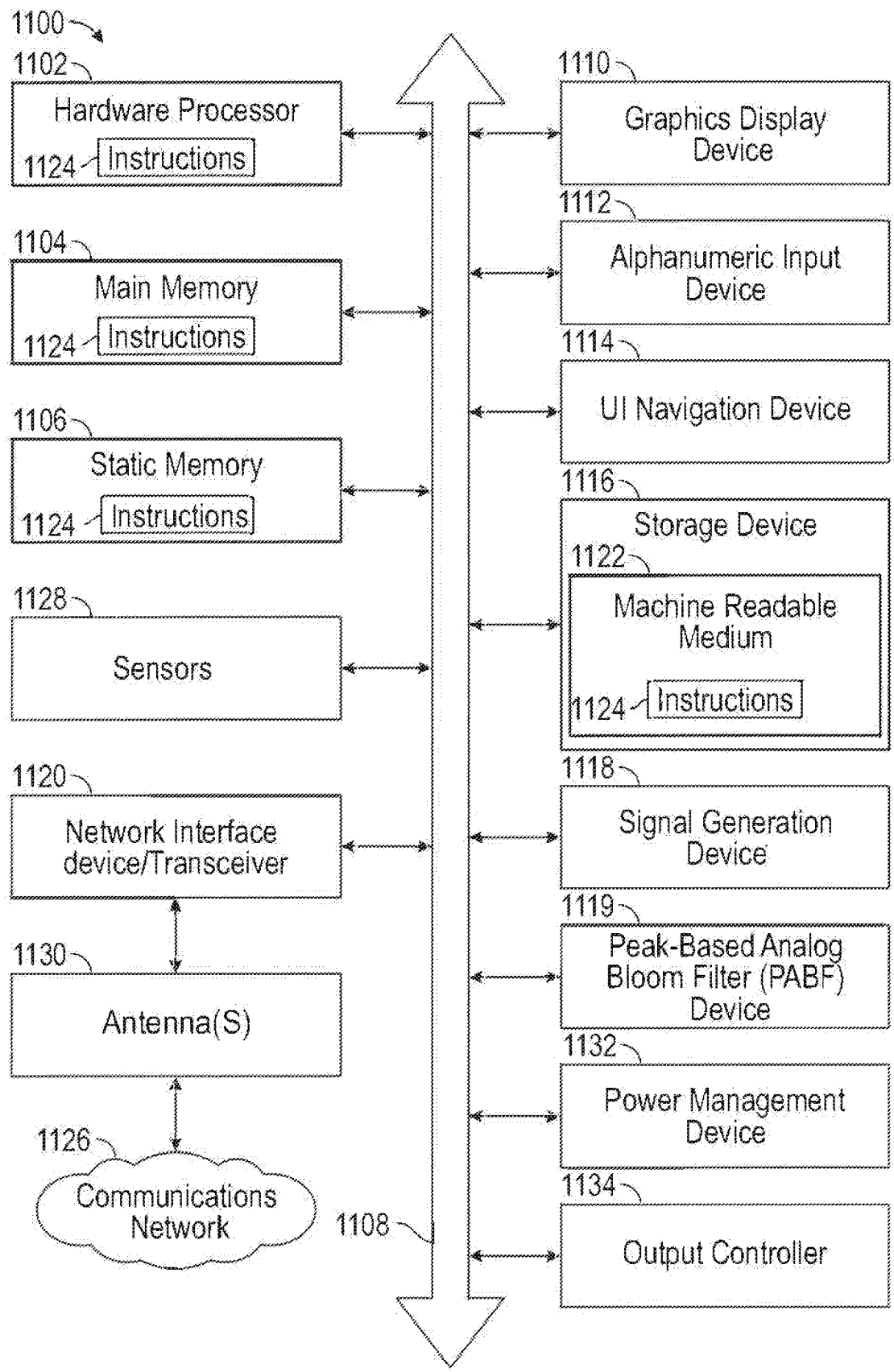
FIG. 11 depicts a block diagram of an example machine upon which any of one or more techniques (e.g., methods) may be performed, in accordance with one or more embodiments of the disclosure.

In some embodiments, the user device(s) 120 and the AP 102 may include one or more computer systems similar to that of the example machine/system of FIG. 11.

One or more illustrative user device(s) 120 and/or the AP 102 may be operable by one or more user(s) 110. The user device(s) 120 (e.g., 124, 126, or 128) and/or the AP 102 may include any suitable processor-driven device including, but not limited to, a mobile device or a non-mobile, e.g., a static, device. For example, the user device(s) 120 and/or the AP 102 may include a user equipment (UE), a station (STA), an access point, a personal basic service set (PBSS) control point, a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small, computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and the AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and the AP 102 may include one or more communications antennas 140. The one or more communications antennas 140 may be any suitable type of antennas corresponding to the communications protocols used by the user device(s) 120 (e.g., user devices 124, 126 and 128), and the AP 102. Some non-limiting examples of suitable communications antennas include, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or the AP 102.

Any of the user device(s) 120 (e.g., user devices 124, 126, 128), and the AP 102 may be configured to perform directional transmission and/or directional reception in conjunction with wirelessly communicating in a wireless network. Any of the user device(s) 120 (e.g., user devices 124, 126, 128), and the AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and the AP 102 may be configured to perform any given directional transmission towards one or more defined transmit sectors. Any of the user device(s) 120 (e.g., user devices 124, 126, 128), and the AP 102 may be configured to perform any given directional reception from one or more defined receive sectors.

Any of the user devices 120 (e.g., user devices 124, 126, 128), and the AP 102 may include any suitable radio and/or transceiver for transmitting and/or receiving radio frequency (RF) signals in the bandwidth and/or channels corresponding to the communications protocols utilized by any of the user device(s) 120 and the AP 102 to communicate with each other. The radio components may include hardware and/or software to modulate and/or demodulate communications signals according to pre-established transmission protocols. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

An antenna for a radio transmitter converts signals into electromagnetic waves to be transmitted to a receiving device. Any antenna that transmits can also receive. A transmitting antenna may generate stronger electromagnetic waves in some directions than other antennas. The antenna may radiate waves of a different amplitude and phase, and each of these waves travels a different distance to the point where a receiving device is located. In some directions, these waves add constructively to give a gain. In some directions, these waves cause interference and a loss of gain. An omnidirectional antenna may be an antenna that has a non-directional pattern (circular pattern) in a given plane with a directional pattern in any orthogonal plane. An omnidirectional antenna may have a wider angle to allow communication with multiple devices.

In communications, beamforming is used to point an antenna at the signal source to reduce interference and improve communication quality. In direction finding applications, beamforming can be used to steer an antenna to determine the direction of the signal source.

The direction of beams may be controlled by varying the angle of the beam pattern, by modifying the orientation of the antenna, or by polarization. In beamforming, both the amplitude and phase of each antenna element may be controlled. Combined amplitude and phase control may be used to adjust various wave levels and directions. The beams may be arranged in a beam pattern that may be defined by an angle that determines the area that the beams may be directed to. For example, the beams of one antenna may have a beam pattern associated with an angle of 120 degrees, 90 degrees, 60 degrees, etc. The angle may be considered an antenna sector. The angle may be varied in order to increase or decrease the area covered by the beam pattern and hence change the antenna sector. For example, increasing the angle may increase the area of a beam pattern and lowering the angle may decrease the area of a beam pattern.

In order for an AP (e.g., AP 102) to establish communication with one or more user device(s) 120 (e.g., user devices 124, 126, and/or 128), the AP 102 may communicate in a downlink direction, and the user device(s) 120 may communicate with the AP 102 in an uplink direction by sending frames in either direction. The frames may include one or more training fields that may be used for channel estimation, channel training, channel characterization, and other functions needed for establishing a channel between a transmitting device, such as an AP 102, and a receiving device, such as a user device 120.

In one embodiment, and with reference to FIG. 1, a device (e.g., the user device(s) 120) may be configured to transmit one or more signals to the AP 102. The signals may include one or more peaks (in the current PABF scheme, an example of a number of peaks per user device may be four, but is not limited to four). The signals may be transmitted as one or more sequences, where a combination of which may be referred to as a pattern. A predetermined set of patterns may be known by all devices (e.g., AP 102 and user devices 120), and a pattern may be selected at random by a user device 120 for signal transmission. The AP 102 may receive the one or more signals and may use a decoding algorithm to determine which user devices 120 (e.g., User Equipment or "UE") are attempting to communicate with the AP 102.

In some embodiments, to generate the transmitted signal, an active UE may randomly pick a pattern among a total of N preselected patterns known to all UEs and the gNB, where a pattern may consist of K unique numbers in [0, H−1]. These N preselected patterns may be unique to the disclosure herein and may not be currently implemented in LTE. As an example, K=4, N=2304. Suppose the UE picked pattern i with values $S_{i,k}$ for k∈[1, K]. In this case the CFO can be estimated and removed, and the UE may also piggyback a multi-bit message in the signal, where the total number of possible messages may be represented as Q. If the UE picked message q, then the UE may generate a summation of peaks represented by as T in Equation 1:

$$T = \sum_{k=1}^{K} \theta_{q,k} \Lambda_{S_{i,k}}$$
(Equation 1)

In other words, T may be the summation of K sequences according to the selected pattern, where sequence k may further be rotated by a phase $\theta_{q,k}$ according to the message. In case the CFO may not be able to be reliably estimated and removed, the sequences may not be rotated.

In some embodiments, after obtaining T, the UE may use a Fast Fourier Transform (FFT) of T to modulate the PRACH subcarriers. A complex signal vector, which may be represented as Ra (where a may represent an antenna "a" of A total antennas), may be determined by Equation 2.

$$R_a = \text{IFFT}[Y_a^* \odot \text{FFT}(\Lambda)],$$
(Equation 2)

With further reference to Equation 2, $Y_a$ may represent the complex values on the H PRACH subcarriers from an antenna a of the A antennas. FFT[ ] and IFFT( ) may represent the FFT and Inverse FFT of a vector, respectively. ⊙ may represent the pairwise multiplication of two vectors, and $Y_a^*$, may represent the conjugate of $Y_a$.

In some embodiments, $\gamma_a$, which may be different than $Y_a$, and may represent power values of Ra that was determined in Equation 2, and may be determined through Equation 3.

$$Y_a = R_a \odot R_a^*,$$
(Equation 3)

In some embodiments, a signal vector to be transmitted by an UE may be represented as $\Omega = \sum_{a=1}^{A} \gamma_a$. Further, the signal vector (Ω) at location h may be represented as $\Omega_h$.

In some embodiments, the decoding algorithm may include at least the following: peak finding and peak strengthening, peak assignment and initial screening, belief propagation, and fake peak removal.

In some embodiments, the first step of the decoding process may involve peak finding and peak strengthening. The list of peaks in the signal may be found by a peak finder algorithm. The peaks may also strengthened, i.e., for each peak, the fCFO and Toff may be estimated and compensated, which may serve to remove side lobes and makes the peak sharper.

In some embodiments, a second step of the decoding process may involve peak assignment and initial screening. For any UE, peaks close to the UE's sequences may be assigned to the UE. If a UE is active, it may be assigned peaks around all its sequences Otherwise, the UE may not have an assignment, and may be discarded.

In some embodiments, a third step of the decoding process may involve belief propagation. Through belief propagation, the set of UE that passed the initial screening may be processed based on an iterative belief propagation algorithm. This iterative algorithm may find the UE that receives maximum credits from a set of peaks, and mark that same UE as active if the total energy on those peaks is above a threshold. Such peaks are said to be owned by the UE and may be removed from the list of peaks.

In some embodiments, a fourth step of the decoding process may involve fake peak removal. After a UE is marked active, the signals near the peaks owned by the UE may be cleaned to remove fake peaks.

In some embodiments, the disclosed PABF may also be used for Scheduled Request (SR). In LTE, SR is used for a connected UE, i.e., a UE with PUCCH for SR configured, to inform the eNB about its intent to transmit uplink data. In a typical setup, the UE transmits on 4 Resource Blocks (RB) in 4 OFDM symbols, which are assigned to the UE by the eNB. On each RB, the UE transmits a sequence of length 12, where the sequence is selected from a total of 12 orthogonal sequences. To increase the capacity, the same 4 sequences on the same RBs may be assigned to 3 UEs, and their signals may still be differentiated by the eNB because the UEs modulates an orthogonal sequence of length 4 on the sequences by changing their phases. With this approach, the number of RBs is basically one ninth of the number of connected UEs, which is unlikely to be scalable to the size of 5G networks.

PABF may likely be a good solution because the number of active UEs may likely be much smaller than the number of connected UEs. The disclosed design supports 503 connected UEs using only 8 RBs and the same physical layer as LTE. The number of orthogonal sequences in this case is 96, and a UE is assigned a pattern that contains 4 sequences appearing in different symbols, where the total number of patterns is 503, generated by a program that iteratively adds a random pattern if this pattern does not have more than 1 common sequence with any of the selected patterns.

SR is in many ways simpler than PRACH, mainly because the peaks do not shift, as the UEs are in the connected mode and may apply Time Advance to compensate for the propagation delay and can estimate and remove the CFO correctly. Therefore, the same method for PRACH may also used for SR, some with very minor changes. In some instances, message generation and decoding, and fake peak removal may be similar. However, in some cases a peak detection, a peak finder and peak strengthener may not be used. A point may be considered a peak if its power value is above a threshold. Additionally, with peak assignment may be relatively the same except for setting the size of the travel range and the expected range to be 1. In other words, not allowing any drift. Further, belief propagation may be relatively the same except for setting the drift weight to be 1 for distance 0, and 0 otherwise.

Example Processes

Figure 10:
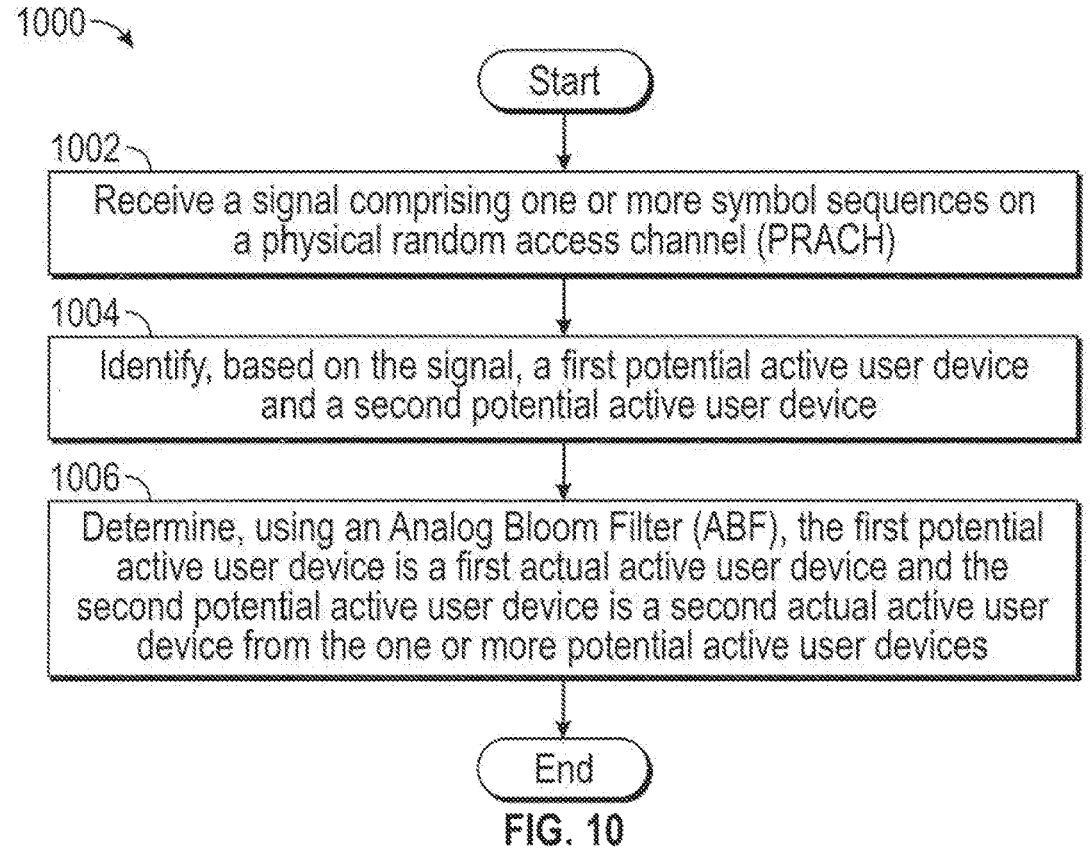
FIG. 10 depicts a flow diagram of illustrative process in accordance with one or more example embodiments of the disclosure.

FIG. 10 illustrates a flow diagram of an example process 1000 in accordance with one or more embodiments of the disclosure.

In various embodiments, block 1002 may involve receiving a signal comprising one or more symbol sequences on a physical random access channel (PRACH);

In some embodiments, the signal may be received by an AP, base station, or the like. The plurality of symbol sequences may be defined as a pattern. Unlike a typical Bloom Filter which may use random assignment, the patterns in PABF may be required to meet the following criteria. Any pattern, after shifting by no more than 15 points (e.g., indices in the signal vector) either to the left or to the right, may overlap with at most one sequence in any other pattern. This may serve to reduce the probability that the sequences transmitted by one UE collide perfectly at more than one location, i.e., appearing at exactly the same locations, with those by another UE.

In some embodiments, patterns may randomly be selected from a known list of predetermined candidate patterns (e.g., known by the UEs and base station). Overall, 2304 patterns may exist to be picked from, which is much more than 64, i.e., the maximum number of sequences supported by the current LTE, and may reduce the collision probability by more than an order of magnitude. In some instances, there may exist an upper bound of the number of such patterns. In addition, using more patterns beyond the 2304 may be detrimental because although it may further reduce collision, it also may also lead to more UEs passing the screening and increase the decoding error probability of the belief propagation algorithm.

In some embodiments, the pattern generation is explained for the current parameter values in PABF; however, the same method can be used for other parameter values. The entire H=839 points may be divided into K=4 segments, each with W=193 points, where the first segment starts at 20 and subsequent segments have gaps of 12 in between. For simplicity, indices in each segment may be considered to be from 0 to 192. Any point with index h∈[0, 191] in the first segment may be part of 12 patterns, with h as the starting point. Let $d_h$=12 mod (h, 12). For any x∈[0, 11], a pattern may be generated with ($d_h$+x) as the step. That is, the point in segment k may be $s_k$=mod [h+$c_k$($d_h$+x), 193], where $c_k$ may be 0, 59, 127, 179 for k=1, 2, 3, 4, respectively.

In some embodiments, the disclosed PRACH scheme may also allow the UE to piggyback multiple bits with the signal, which may be used to inform the gNB about key information, such as the priority of its data, which may be very useful in network scheduling.

In some embodiments, information may be carried by modulating the phases of the sequences. Although the channel may distort the signal, the relative phases between any two sequences may not change, which may be used by the gNB to decode the message. To be more specific, with the current design, the UE may send one among a total of Q=7 messages. Suppose the message is q. For sequence k, the UE multiplies it by $e^{\theta_{q,k}}$, where $\theta_{q,k}$ is the modulated phase. The phase values may be selected such that they satisfy the decoding requirement, i.e., for any two messages $q_1$ and $q_2$, and for any two sequences $k_1$ and $k_2$, the two phase differences of the messages on the sequences, namely, $\theta_{msgid_1,k_1} - \theta_{q_1,k_2}$ and $\theta_{q_2,k_1} - \theta_{q_2,k_2}$, are distinguishable. The decoding requirement may be satisfied, because any sequences may experience collisions, and the information carried by such sequences may be lost. To recover the information, the phase differences may be unique for different messages for any set of surviving sequences.

In some embodiments, the phase selection may be performed as follows:

Let Q be a prime number no less than K. For any 0≤q≤Q−1 and 0≤k≤K−1, let $$\theta_{q,k} = \frac{2\pi \mod(qk, Q)}{Q}$$

$\theta_{q,k}$ may satisfy the decoding requirement.

The proof supporting the phase selection may involve the following. Let $$q_1 k_1 - q_1 k_2 = q_1(k_1 - k_2) = a_1 Q + b_1,$$

and $$q_2 k_1 - q_2 k_2 = q_2(k_1 - k_2) = a_2 Q + b_2.$$

The two phase differences are indistinguishable if and only if $(q_1-q_2)(k_1-k_2)$ is a multiple of Q, which cannot happen because both $(q_1-q_2)$ and $(k_1-k_2)$ are within [−Q+1, Q−1] while Q is a prime number.

In various embodiments, block 1004 may involve identifying, based on the signal, a first potential active user device and a second potential active user device. The following may be a list of main notations that may be used in this section: peak l may be denoted as $P_l$, and its location and value may be denoted as $L_l$ and $V_l$, respectively, where the value of a peak may be the total power received from all antennas at its location. ξ may represent the minimum power a UE must show on a sequence on average to be considered active.

In various embodiments, identifying, based on the signal, a first potential active user device and a second potential active user device may comprise identifying a first signal peak and a second signal peak within the signal. The identification may be performed by a peak finder algorithm. The simplest form of peak finder may be to use a threshold and mark any point above the threshold a peak. However, due to energy spreading, a point may be above the threshold simply because it is on the tail of a high peak, and thus a more advanced peak finder may be required.

Figure 3:
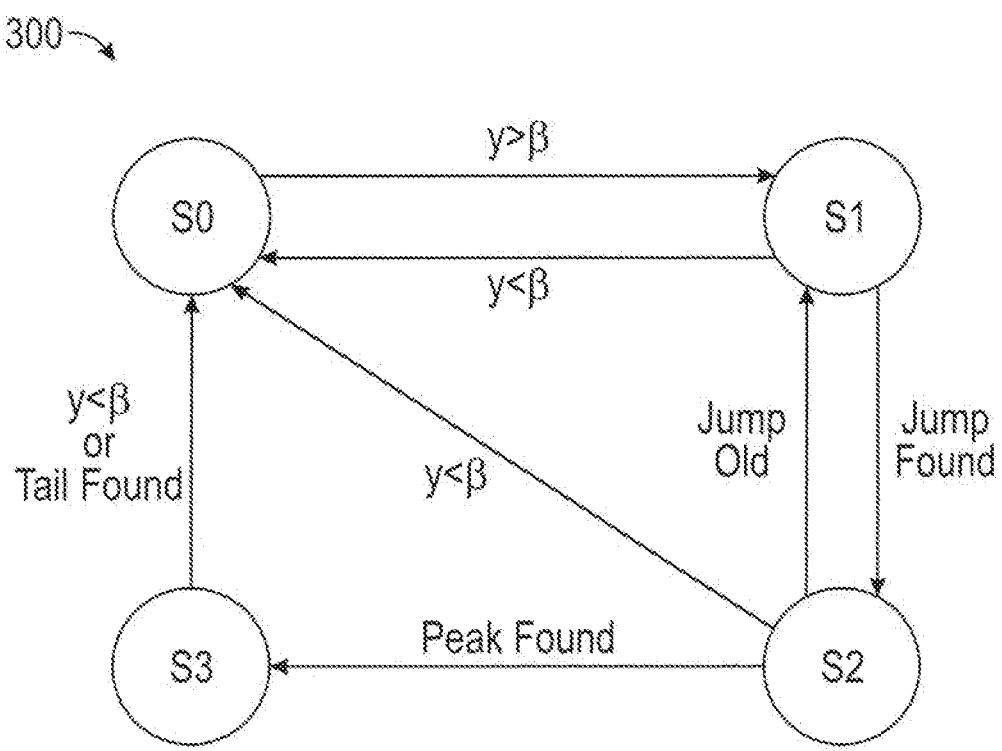
FIG. 3 depicts a finite state machine in accordance with one or more example embodiments of the disclosure.

In some embodiments, the more advanced peak finder algorithm may take the signal vector received from the one or more UEs and a threshold value β as inputs, and output a list of peaks. It may perform a linear scan on the signal vector, where the value of the current scanned location may be denoted as y. The algorithm may be in the form of a finite state machine (e.g., the finite state machine shown in FIG. 3). The finite state machine may scan through the indices of the signal vector and identify a peak by locating a steep change upwards in values found in subsequent indices, then finding a steep change downwards in values in subsequent indices after the indices indicating a steep change upwards, and finally finding a local maximum within the steep change upwards and the steep change downwards.

More specifically, in some embodiments, the finite state machine (e.g., the finite state machine shown in FIG. 3) may be initialized to state S0. the finite state machine may enter state S1 only if a new signal (e.g., an index in the signal vector) at the current scanned location is higher than β. Once in state S1, the finite state machine may transition to state S2 if the new signal is a jump, i.e., either if it is more than three times of the last signal at the last scanned location, or it is more than five times the minimum of the signal from the last jump location until the last signal. Once in state S2, the finite state machine may transition to state S3 if a peak is found, i.e., a location that is the local maxima. Once in state S3, the finite state machine may transition back to state S0 if a tail of a peak is found, i.e., the new signal is higher than the last signal by at least 20%. In all states (e.g., S1-S3), the finite state machine may transition back to state S0 if new signal is lower than β. The finite state machine may also transition from state S2 back to state S1 if a peak has not been found since the last jump for 3 points; however, the jump condition may also evaluated in S2. The peak may be outputted when the state machines transitions from state S2 or state S3 back to state S0.

In some embodiments, to combat fCFO and Toff, the peaks may also be strengthened. This may involve a set of frequency shifts and time shifts being applied to the received signal to cancel fCFO and Toff, where the frequency shift and time shift may be called adjustment parameters. For each peak, a combination of adjustment parameters may be assigned, which may lead to the maximum height of the peak, i.e., the energy may be focused on the actual peak and reduced on the side lobes. For example, the frequency shift may take 16 evenly spaced values from 0 to 0.9375 of the subcarrier spacing. The time shift may be from 0, 1, 2, 3 because the peak location may be shifted by one point if time is shifted by four samples.

As an example, a signal vector with adjustment parameter combination q may be represented as $\Omega^q$. With the adjustment of the frequency and time, the peak locations may be shifted, therefore $\Omega^q$ may also be cyclically shifted to the left or right by no more than 1 point to compensate for the shift. The peak finder may be used to find a list of candidate peaks in $\Omega^q$ for all q.

In some instances, an iterative process may be started to add peaks to the actual peak list. In each iteration, the maximum signal power location among $\Omega^q$ for all q may be selected as a possible peak location to be inspected. Suppose this location is $L_l$ and is in $\Omega^{q*}$. $L_l$ can be rejected in three cases: the peak finder did not mark it as a peak in $\Omega^{q*}$, or there already exists an identified peak only 1 point away, or $L_l$ has been masked in earlier iterations. If the location is selected as peak, say, $P_l$, the adjustment parameters in combination q* may be used as the adjustment parameters of peak $P_l$.

In some instances, the next step may be to clean up the nearby peaks that are actually the side lobes of peak $P_l$. Such side lobes may not exist in $\Omega^{q*}$, because almost all energy focuses at location $L_l$ in $\Omega^{q*}$. The side lobes may appear with other adjustment parameters, so to prevent side lobes being misidentified as peaks, the neighborhood peak $P_l$ may be masked and may be ignored in future iterations. There may of course be actual peaks in the neighborhood. Such peaks may still likely appear as peaks in $\Omega^{q*}$, and may be added to the real peak list in this iteration.

To be more specific, as an example, let the neighborhood of peak $P_l$ be denoted as [lb, rb], where lb is $L_l$–12 or the closest location to the left of $L_l$ such that the power at lb is at least ⅛ of the power at $L_l^*$ in $\Omega^{q*}$ and rb may be defined in a similar way. All points in [lb, rb] may be masked. A location [lb, rb], denoted as L', if identified by the peak finder as a peak in $\Omega^{q*}$, may still add a peak to list of peaks. A best combination of adjustment parameters may also be selected for the new peak. That is, for each q, let $L'^q$ be the maximum power location among [L'–1, L'+1], provided that $L'^q$ is not only one point away from any identified peaks. Let q'* be the combination that results in highest value among all $L'^q$. The new peak may be at $L'q'^*$ with adjustment parameter index q'*. Note that $L'^{q'*}$ may be different from L' because the location of the peak may be shifted by 1 due to additional frequency and time shift. Denote $\hat{\Omega}$ as the final signal vector after peak strengthening. In all locations, by default, $\hat{\Omega}=\Omega^1$, i.e., the signal vector without any adjustment of frequency and time. However, $\hat{\Omega}$ will be changed for locations around the identified peaks. To be more specific, if the best adjustment parameter index of peak $P_l$ is q, $\hat{\Omega}=\Omega^q$ for [Ll–1, $L_l$+1]. Also, $V_l=\Omega_{L_1}^q+\max\{\Omega_{L_1-1}^q,\Omega_{L_1+1}^q\}$ because certain energy may still be at point nearby. Lastly, very weak peaks may be removed, which are peaks that may have values less than 0.9ξ.

In various embodiments, identifying one or more active user devices may also comprise associating the first signal peak to a first potential active user device and the second signal peak to a second potential active user device.

In various embodiments, identifying one or more active user devices may also comprise peak assignment and initial screening. The peak assignment process may be the same for all UEs and all sequences, so the peak assignment and initial screening process may be explained for a generic UE, $U_i$, which has sequences $S_{i,k}$ for k=1 to 4. The travel range of the sequence $S_{i,k}$ may be defined as [$S_{i,k}$–14, $S_{i,k}$+3]. Without knowing the actual propagation delay, any peak in the travel range may potentially be caused by sequence $S_{i,k}$. The current range may be selected assuming the maximum propagation delay is 11 μs. However, if a peak $P_l$ is assigned to $U_i$ as long as it is in the travel range, many idle UEs may be assigned peaks. Therefore, two additional checks may be performed based on the concept of friend peaks. A drift of peak $P_l$ may be defined with respect to pattern $U_i$ as $\delta_{l,i}=L_l-S_{i,k}$. For any k'≠k, its expected friend range is defined as [$S_{i,k'}+\delta_{l,i}$–2, $S_{i,k'}+\delta_{l,i}$+2]. Any peak in the expected friend range of any k' is called a friend peak of peak $P_l$ with respect to pattern $U_i$. Note that if peak l may be a peak generated by UE $U_i$, $U_i$ would have also generated other peaks in the expected friend ranges, because all peaks by the same UE may be shifted by the same amount. Therefore, the two additional check may be: a signal power check and a friend peak check. Regarding the signal power check, the maximum of $\Omega^q$ in the expected friend range of any k'=k must be above max {0.35ξ,0.125 $V_l$}, where q is the best adjustment parameter index of $P_l$. This is because the signal power cannot be too weak if a peak is in this range Regarding the friend peak check, there may exist at least one k'≠k with is a peak in its expected friend range. This is because a peak is expected to have at least one friend peaks. Finally, a UE may be discarded if it has no assigned peak.

In various embodiments, identifying one or more active user devices may also comprise belief propagation. Belief propagation may identify the set of active UEs. Belief propagation may view the power values of the peaks as credits, and may award credits from the peaks to the UEs that have most likely generated the peaks. In some instances, a peak may be assigned to multiple UEs. In such instances, a credit may be awarded to a UE proportionally to the amount of credits this UE has received from other peaks, by viewing the credits from other peaks as the belief in this UE. Belief propagation in PABF may involve only propagating between friend peaks. An exemplary belief propagation algorithm is provided below in "Algorithm 1". $\Psi_i$: the set of peaks assigned to UE $U_i$. $\Gamma_l$: the set of UEs to which peak $P_l$ is assigned. $\eta_{l,i}$: the competing score of UE $U_i$ for peak $P_l$. $F_{l,i}$: the friend peak set of peak $P_l$ for UE $U_i$. $\chi_{l,i}$: the credit peak $P_l$ gives to UE $U_i$. a( ): the drift weight. Currently, it is 1, 0.5, 0.33 for drift distance of 0, 1, and 2, respectively. $\phi_{l,i}$: the total credits UE $U_i$ gets from peak $P_l \cup F_{l,i}$.

---

Algorithm 1: Belief Propagation

1:    For all l, evenly distribute $V_l$ to all UEs assigned with $P_l$.
2:    while iterated no more than 100 times do
3:        for each remaining UE $U_i$ do
4:            for every peak $P_l \in \Psi_i$ do
5:                $\eta_{l,i} \leftarrow \Sigma_{t \in F_{l,i}} \chi_{t,i} \alpha(|\delta_{l,i} - \delta_{t,i}|)$
6:            end for
7:        end for
8:        for each remaining peak $P_l$ do
9:            for every $U_i \in \Gamma_l$ do
10:    
$$\chi_{l,i} \leftarrow \frac{V_l \eta_{l,i}}{\sum_{t \in \Gamma l} \eta_{l,t}}$$
11:           end for
12:       end for
13:    If the last UE was marked 7 iterations ago then
14:        for each remaining UE $U_i$ do
15:            for every peak $P_l \in \Psi_i$ do
16:                $\phi_{l,i} \leftarrow \chi_{l,i} + \Sigma_{t \in F_{l,i}} \chi_{t,i}$
17:            end for
18:            Let $\phi_{l^*,i}$ be the maximum among all $P_l \in \Psi_i$.
                Let $\psi_i$ be $P_{l^*} \cup F_{l^*,i}$.
19:        end for
20:        Suppose UE $U_u$ gets maximum credits. Let $V^{max}$ and $V^{min}$ be the maximum and minimum peak value among $P_l \in \psi_u$.
21:        If $\Sigma_{P_l \in \psi_u} V_l < \xi |\psi_u|$ or ($|\psi_u| == 2$ and $V^{max} > 2.5 V^{min}$) then
22:            Mark $U_u$ as idle.
23:        else
24:            Mark $U_u$ as active. Remove the peaks in $\psi_u$.
25:            Perform fake peak removal.
26:        end if
27:    end if
28:    end while

---

In some embodiments, the algorithm may first evenly distribute credits of a peak to all UEs this peak is assigned to. It may then enter a loop. In each iteration of the loop, the algorithm may first calculate the competing score of a UE for a peak, which may be the summation of the credits the UE gets from peaks in the friend set, weighted by the difference of the drift of the peaks. This may be because friend peaks may still have different drifts, but larger differences are more unlikely for peaks belonging to the same UE. The algorithm may then distribute the credits of a peak to the UEs proportionally according to the competing scores. Every seven iterations, the algorithm may find for each UE the maximum credit it may obtain from a peak and its friend set. The UE with maximum credit may then be marked as active, if the total power of the set of peaks that helped the UE achieve the maximum credit is above a threshold, and if the set does not contain just two very different peaks. These peaks may be deemed owned by the UE and may be removed.

In various embodiments, identifying one or more active user devices may also comprise fake peak removal. As one example, a fake peak may result from reflections of signals from objects, such as buildings, that cause weaker, delayed peaks associated with the same UE. In this case, one peak may have been sent, but two peaks may have been received due to the reflection. As mentioned earlier, two main challenges with ZC sequences may be the multiple peaks due to multi-path, fCFO, and the energy spread. After peak strengthening, the side peaks due to fCFO have been mostly removed, and the side peaks are mainly from weaker paths. Energy spread makes it easier for noise to generate shoulder peaks, i.e., fake peaks standing on the tail of a high peak. Such fake peaks should be removed, because they will lead to many False Positive errors. The challenge is to distinguish a real side peak or shoulder peak from a weak peak from another UE. In some instances, PABF removes fake peaks after the active UE has been identified. Note that the side peaks and shoulder peaks are usually much weaker than the main peaks, and do not lead to False Positives before the UE that generated the main peaks has been found active, because this UE gathers higher credits will be identified first. After the UE has been identified, the high similarities of the peaks from the same UE can be exploited. For example, very often, if a peak is indeed a side peak, there are usually side peaks at exactly the same relative positions to other main peaks. Also, if a main peak has a heavy tail, tails of similar height and length usually exist for other main peaks. Therefore, the key novelty of PABF is to subtract the signals near a main peak by the signals near other main peaks to cancel out the common parts, i.e., the common side peaks and the common tails. After the subtraction, fake peaks will be canceled, but real peaks will likely remain.

In some embodiments, as an example, after $U_{l'}$ is found active, the fake peak removal process first finds the peaks within the fake peak range, which is currently 15 points and 10 points to the left and right of a main peak, respectively. Without loss of generality, consider such a peak at location $L_{l_1}-x$, which is close to a main peak at $L_{l_1}$, and suppose the other main peaks in $\psi_u$ are at $L_{l_2}, L_{l_3}, \ldots, L_{l_K}$. For each point in $[L_{l_1}-x-1, L_{l_1}-x+1]$, such as $L_{l_1}-x$, the algorithm subtracts $$\hat{\Omega}_{L_{l_1}} - x$$

by the average of the lower two among $$\hat{\Omega}_{L_{l_1}} - x$$

to $$\hat{\Omega}_{L_{l_K}} - x.$$

The peak will be removed if the its remaining peak power is below $0.9\xi$ after the subtraction Two additional steps may be taken, including heuristics. First, not all main peaks in $\psi_u$ may be used in the signal subtraction. To be more specific, continuing with the earlier example, when subtracting power of point $L_{l_1}-x$, $L_{l_t}$ is not used, if there is a peak within $[L_{l_t}-5, L_{l_t}+5]$ that has power value over $2V_{L_{l_t}}$, or if there is a peak within $[L_{l_t}-2, L_{l_t}+2]$ that has power value over $1.5V_{l_t}$. Second, if two or more side peaks are removed at the same relative position to the main peaks, while the side peaks are within the maximum delay spread of the site, i.e., 7 points and 3 points to the left and right of the main peaks, respectively, this UE is considered a high delay spread node, and all peaks in the delay spread range are removed.

In various embodiments, block 1006 may involve determining, using an Analog Bloom Filter (ABF), the first potential active user device is a first actual active user device and the second potential active user device is a second actual active user device from the one or more potential active user devices.

Simulation Results

In the simulation, the number of antennas of the gNB is 2. The SNR is defined as the received signal power of the weakest UE over the noise power at the 839 PRACH subcarriers in the frequency domain. In case there are multiple active UEs, to simulate imperfect transmission power control, the difference of received powers of the weakest and the strongest UE is fixed at a chosen value, such as 20 dB; the powers of other UEs are uniformly distributed within this range. The error ratio is defined as the total number of errors, including the False Positive, False Negative, and Collision, over the total number of simulation rounds. Two types of channels are considered, namely the EPA and the ETU channels, representing the low and high delay spread channels, respectively.

Figure 4A:
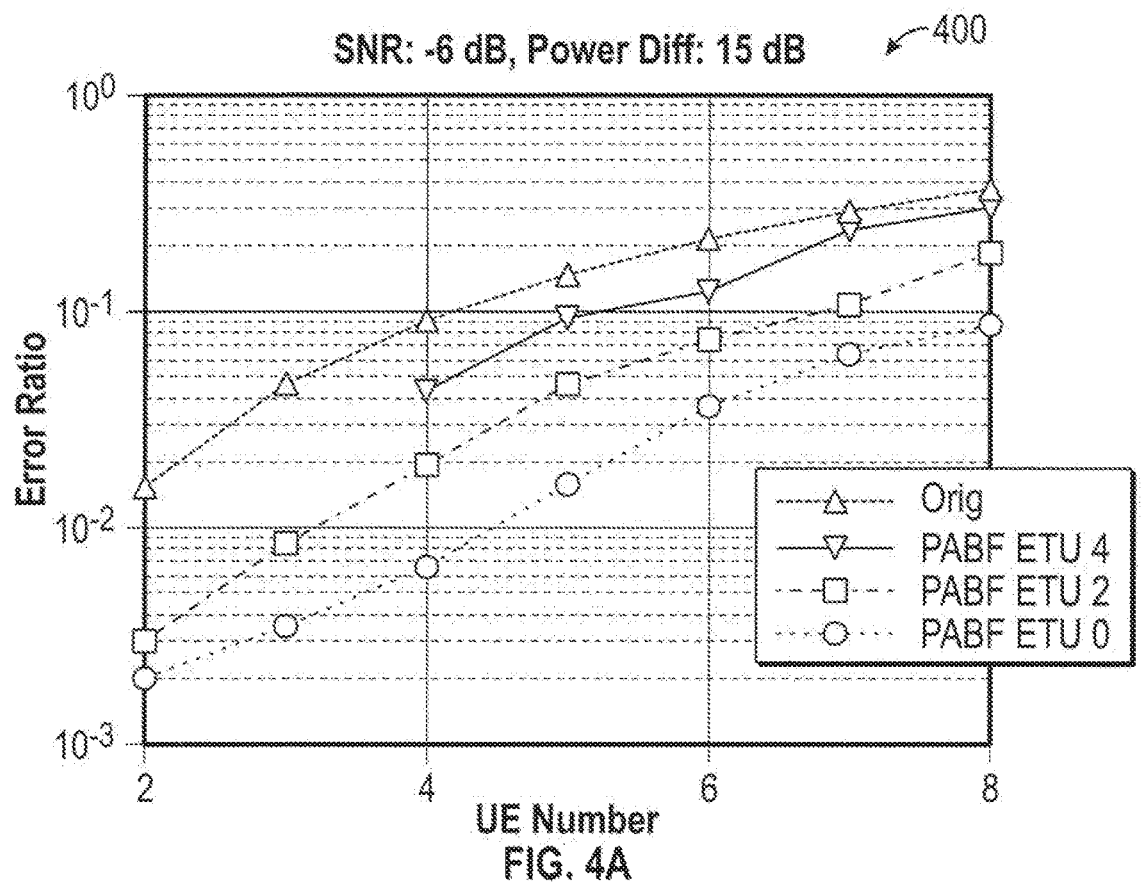
FIG. 4A depicts a graph showing an error ratio as a function of the number of UEs in accordance with one or more example embodiments of the disclosure.
Figure 4B:
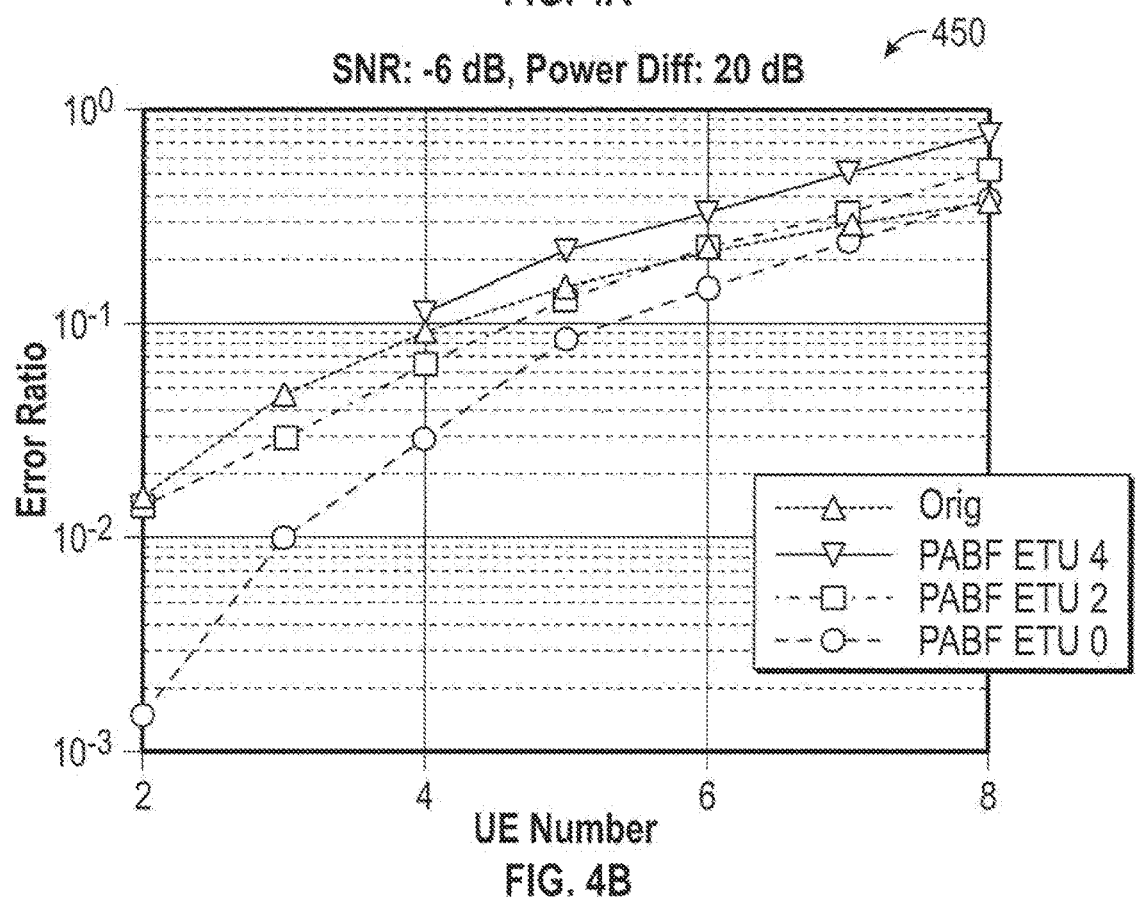
FIG. 4B depicts a graph showing an error ratio as a function of the number of UEs in accordance with one or more example embodiments of the disclosure.

FIGS. 4A and 4B show the error ratios as a function of the number of UEs. For comparison, the collision ratio of the current LTE PRACH is calculated, referred to as Orig in the figures, which is basically is a lower bound of its error ratio, because no other types of errors are considered. For PABF, three cases are considered, with 0, 2, and 4 UEs on ETU channels, respectively, while others are on EPA channels.

In FIG. 4A, the SNR and power difference are −6 dB and 15 dB, respectively, representing fairly challenging conditions, i.e., the signal power of the weakest node is much lower than noise, while the signal power of other UEs may be much higher, causing interferences. It can be seen that PABF outperforms LTE PRACH by a large margin. For example, when there is no ETU UE, the error ratio of PABF is around an order of magnitude lower than LTE PRACH up to 6 total UEs. As expected, more ETU UEs will increase the error ratio; however, in all tested cases, PABF still consistently outperforms LTE PRACH. For example, with 2 ETU UEs, the error ratio with PABF is from about 20% to 50% of that of LTE PEACH. Therefore, PABF will likely bring significant improvements to the performance of PRACH, as most UEs will likely have small delay spread and will have channels similar to EPA.

FIG. 4B shows even more challenging conditions, in which the SNR is still −6 dB, but the power difference is 20 dB. It should be noted that 20 dB of power difference should be very rare, because it means that the strongest UE power is 100 times of the weakest, which should only occur when the transmission power control module has made a very large error. It can be seen that when there is no ETU UE, PABF still outperforms LTE PRACH quite significantly when the total number of UEs is small, i.e., no more than 4. Even with 2 ETU UEs, PABF still matches the LTE PRACH performance.

Figure 5:
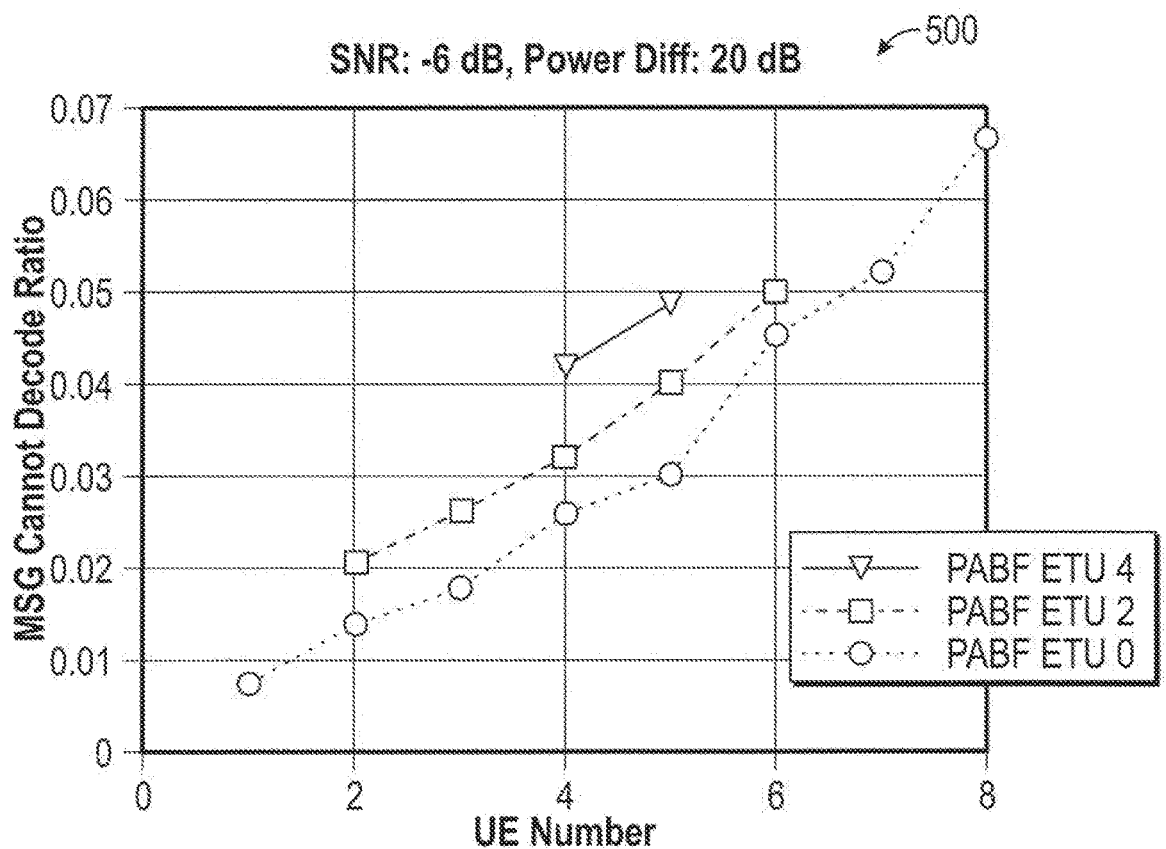
FIG. 5 depicts a graph showing a message decoding failure ratio as a function of the number of UEs in accordance with one or more example embodiments of the disclosure.

When CFO can be estimated correctly and removed, it was found that the message error ratios in all simulations are very low, with the maximum being only 0.3%, therefore, they are not shown. FIG. 5 shows the decoding failure ratio as a function of the number of UEs, where it may be seen that, as expected, the decoding failure ratio increases with the number of UEs and the number of ETU UEs, because more UEs or more ETU UEs may erase signals on more locations. However, the failure ratio is still very low, all below 7%.

Figure 6:
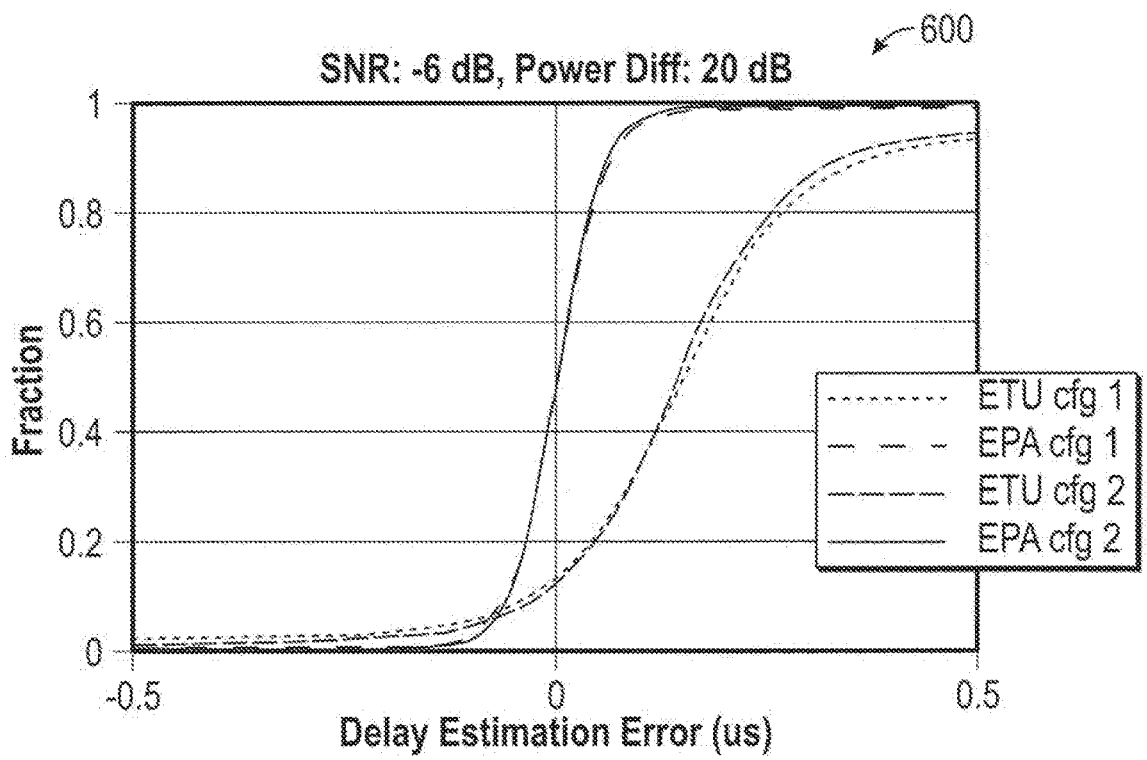
FIG. 6 depicts a graph showing delay estimation performance in accordance with one or more example embodiments of the disclosure.

When the CFO can be estimated correctly and removed, the delay estimation performance is shown in FIG. 6 for two configurations, referred to as cfg1 and cfg2, respectively, where the numbers of EPA and ETU UEs are 7 and 1 for cfg1 and are 4 and 2 for cfg2. It may be seen that the estimation errors for the EPA UEs are very low, i.e., mostly within ±0.2 μs, but are higher for the ETU UEs. Also, the errors are very close for the same types of UEs in the two configurations, suggesting that the delay estimation mostly depend on the channel type. For example, it was found that large errors of the ETU UEs may occur when the channel has a weak first path followed by a strong path. In such cases, the estimation error is the delay difference of the two paths, which may be 1 μs or more, as the algorithm tends to find the delay of the strongest path, while the propagation delay is defined according to the first path in this simulation.

Figure 7:
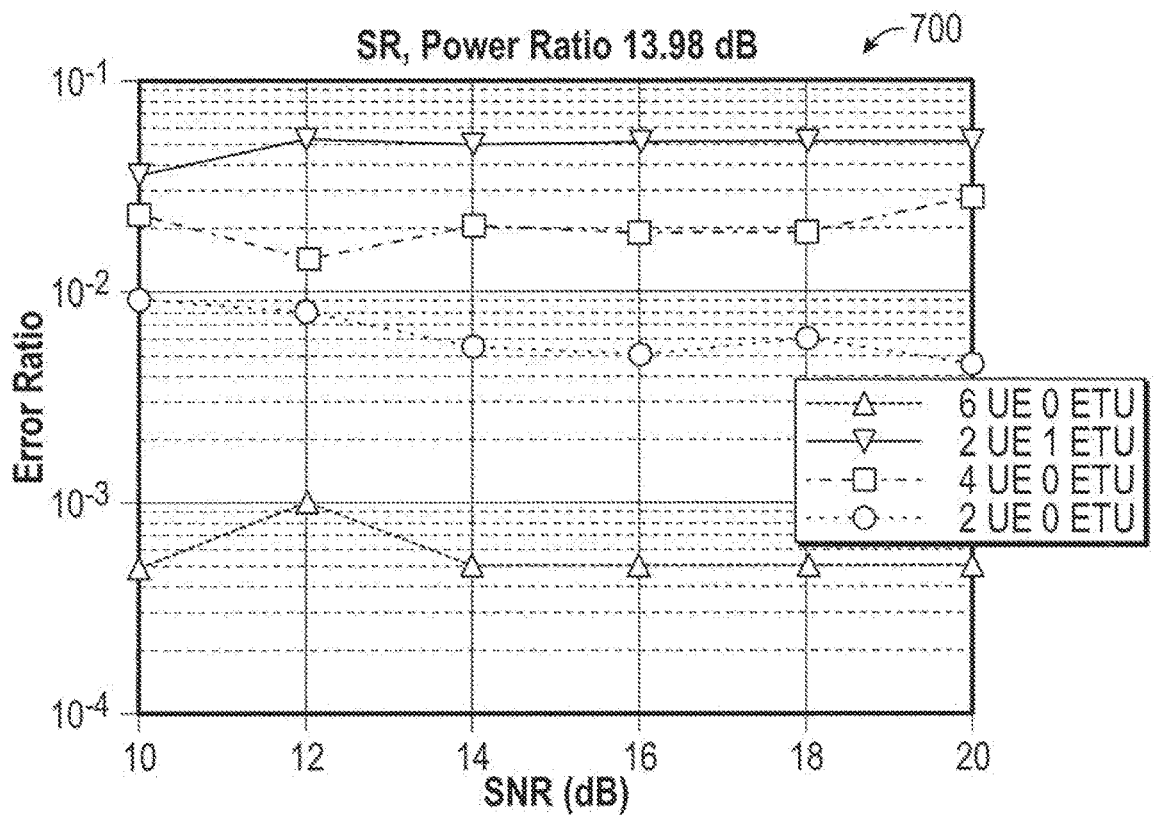
FIG. 7 depicts a graph showing error ratio for Scheduled Request (SR) as a function of Signal to Noise Ratio (SNR) in accordance with one or more example embodiments of the disclosure.
Figure 8:
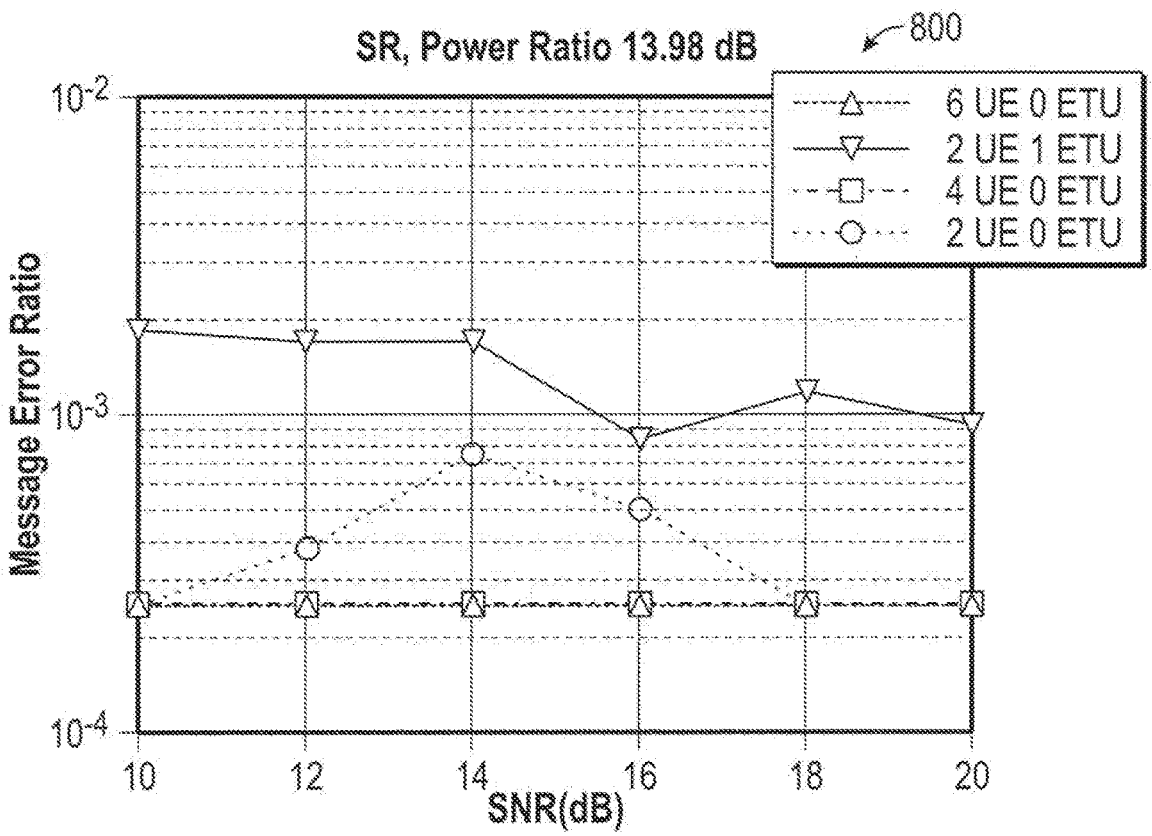
FIG. 8 depicts a graph showing message error ratio for Scheduled Request (SR) in accordance with one or more example embodiments of the disclosure.
Figure 9:
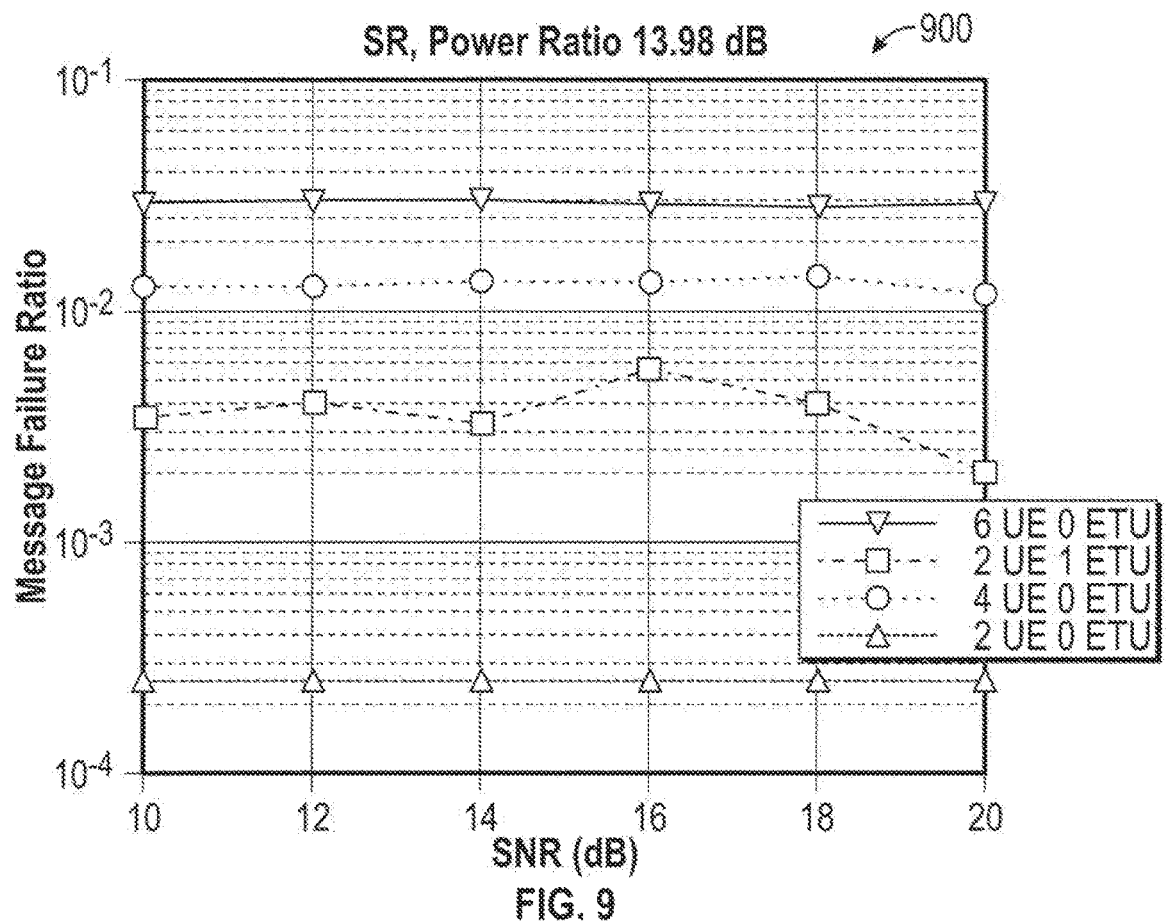
FIG. 9 depicts a graph showing message decoding failure ratio for Scheduled Request (SR) in accordance with one or more example embodiments of the disclosure.

Simulations related to Scheduled Request (SR) are shown in FIG. 7, FIG. 8, and FIG. 9. FIG. 7 shows the error ratio as a function of SNR, where the SNR is defined as the power of the weakest UE over the power of noise on the RB used by the UE. It may be seen that the error ratio with 2 EPA UEs are very low, i.e., $10^{-3}$ or less. As expected, more UEs or adding ETU UE increases the error. FIG. 8 shows the message error ratio, which is very low in all cases, i.e., around $10^{-3}$ or lower. FIG. 9 shows the message decoding failure ratio, which is low in all cases, i.e., below 3%.

Example Devices

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1144 may be a touch screen display. The machine 1100 may additionally include a storage device (i.e., drive unit) 1116, a signal generation device 1118 (e.g., a speaker), a Peak-based Analog Bloom Filter (PAFB) device 1119, a network interface device/transceiver 1120 coupled to antenna(s) 1130, and one or more sensors 1128, such as a global positioning system (GPS) sensor, compass, accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The Peak-based Analog Bloom Filter (PABF) device 1119 may be carried out or performed any of the operations and processes (e.g., process 1000) described and shown above. For example, the PABF device 1119 may be configured to receive a signal comprising one or more symbol sequences on a physical random access channel (PRACH); identify, based on the signal, a first potential active user device and a second potential active user device, wherein to identify the first potential active user device and the second potential active user device comprises: identify a first signal peak and a second signal peak within the signal; and associate the first signal peak to a first potential active user device and the second signal peak to a second potential active user device; and determine, using an Analog Bloom Filter (ABF), the first potential active user device is a first actual active user device and the second potential active user device is a second actual active user device from the one or more potential active user devices.

In some embodiments, to identify a first signal peak and a second signal peak within the signal further comprises: receive a threshold value; and perform a linear scan of the at least one signal, wherein the at least one signal comprises a signal vector comprising one or more indices, and wherein to perform the linear scan includes: determine that a value of a first scanned index of the one or more indices is higher than the threshold; determine a location of a jump is the value of the first scanned index based on the value of the first scanned index being at least one of (1) either more than three times larger than a value of a last scanned index or (2) more than five times a minimum value corresponding to the lowest value of any index of a set of indices between the index of a last jump and the last scanned index; and identify the first signal peak, wherein the signal peak is a local maxima.

In some embodiments, identify one or more active user devices further comprises strengthening the signal peak.

In some embodiments, the Peak-based Analog Bloom Filter (PABF) device 1119 is further configured to: receive a list of peaks, the list of peaks including a third signal peak; determine that the third signal peak is associated with both the first potential active user device and the second potential active user device; determine a first summation of credits the first potential active user device has received from a signal peak friend set associated with the first potential active user device and a second summation of credits the second potential active user device has received from a signal peak friend set associated with second potential active user device; determine that the first summation of credits is a maximum credit allocation, a total power of the first potential active user device signal peak friend set is above a threshold, and the first active user device friend set has peaks of similar power values; and identify the first potential active user device as owning the first signal peak.

In some embodiments, the Peak-based Analog Bloom Filter (PABF) device 1119 is further configured to: receive a list of peaks associated with the first potential active user device; and subtract signals near a first peak of the list of peaks associated with the first potential active user device by signals near one or more other peaks of the list of peaks associated with the first potential active user device to remove fake peaks.

In some embodiments the plurality of symbol sequences comprise a pattern, and wherein the pattern is selected based on criteria including at least: that the pattern, after shifting by no more than a certain number of points, such as 15 points, to either the left or to the right, does not overlap with at most one sequence in any other pattern and that any two sequences in the pattern are separated by a minimum distance.

In some embodiments, fake peaks may include at least one of side peaks or shoulder peaks.

In some embodiments, the Peak-based Analog Bloom Filter (PABF) device 1119 is further configured to decode a multiple bit message from the one or more potential active user devices based at least in part on the one or more signal peaks; and estimate a propagation delay associated with the one or more potential active user devices based at least in part on the one or more signal peaks.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates a Radio Frequency Identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Example Embodiments

Example one may include a device, the device comprising memory and processing circuitry configured to: receive a signal comprising one or more symbol sequences on a physical random access channel (PRACH); identify, based on the signal, a first potential active user device and a second potential active user device, wherein to identify the first potential active user device and the second potential active user device comprises: identify a first signal peak and a second signal peak within the signal; and associate the first signal peak to a first potential active user device and the second signal peak to a second potential active user device; and determine, using an Analog Bloom Filter (ABF), the first potential active user device is a first actual active user device and the second potential active user device is a second actual active user device from the one or more potential active user devices.

Example two may include the device of example one, wherein to identify a first signal peak and a second signal peak within the signal further comprises: receive a threshold value; and perform a linear scan of the at least one signal, wherein the at least one signal comprises a signal vector comprising one or more indices, and wherein to perform the linear scan includes: determine that a value of a first scanned index of the one or more indices is higher than the threshold; determine a location of a jump is the value of the first scanned index based on the value of the first scanned index being at least one of (1) either more than three times larger than a value of a last scanned index or (2) more than five times a minimum value corresponding to the lowest value of any index of a set of indices between the index of a last jump and the last scanned index; and identify the first signal peak, wherein the signal peak is a local maxima.

Example three may include the device of example two, wherein identify one or more active user devices further comprises strengthening the signal peak.

Example four may include the device of example two, wherein the device is further configured to: receive a list of peaks, the list of peaks including a third signal peak; determine that the third signal peak is associated with both the first potential active user device and the second potential active user device; determine a first summation of credits the first potential active user device has received from a signal peak friend set associated with the first potential active user device and a second summation of credits the second potential active user device has received from a signal peak friend set associated with second potential active user device; determine that the first summation of credits is a maximum credit allocation, a total power of the first potential active user device signal peak friend set is above a threshold, and the first active user device friend set has peaks of similar power values; and identify the first potential active user device as owning the first signal peak.

Example five may include the device of example four, wherein the device is further configured to: receive a list of peaks associated with the first potential active user device; and subtract signals near a first peak of the list of peaks associated with the first potential active user device by signals near one or more other peaks of the list of peaks associated with the first potential active user device to remove fake peaks.

Example six may include the device of example one, wherein the plurality of symbol sequences comprise a pattern, and wherein the pattern is selected based on criteria including at least: that the pattern, after shifting by no more than a certain number of points, such as 15 points, to either the left or to the right, does not overlap with at most one sequence in any other pattern and that any two sequences in the pattern are separated by a minimum distance.

Example seven may include the device of example five, wherein fake peaks may include at least one of side peaks or shoulder peaks.

Example eight may include the device of example one, wherein the memory and processing circuitry are further configured to: decode a multiple bit message from the one or more potential active user devices based at least in part on the one or more signal peaks; and estimate a propagation delay associated with the one or more potential active user devices based at least in part on the one or more signal peaks.

Example nine may include a method, comprising: receiving a signal comprising one or more symbol sequences on a physical random access channel (PRACH); identifying, based on the signal, a first potential active user device and a second potential active user device, wherein to identify the first potential active user device and the second potential active user device comprises: identifying a first signal peak and a second signal peak within the signal; and associating the first signal peak to a first potential active user device and the second signal peak to a second potential active user device; and determining, using an Analog Bloom Filter (ABF), the first potential active user device is a first actual active user device and the second potential active user device is a second actual active user device from the one or more potential active user devices.

Example ten may include the method of example nine, further comprising: receiving a threshold value; and performing a linear scan of the at least one signal, wherein the at least one signal comprises a signal vector comprising one or more indices, and wherein to perform the linear scan includes: determining that a value of a first scanned index of the one or more indices is higher than the threshold; determining a location of a jump is the value of the first scanned index based on the value of the first scanned index being at least one of (1) either more than three times larger than a value of a last scanned index or (2) more than five times a minimum value corresponding to the lowest value of any index of a set of indices between the index of a last jump and the last scanned index; and identifying the first signal peak, wherein the signal peak is a local maxima.

Example eleven may include the method of example ten, wherein identify one or more active user devices further comprises strengthening the signal peak.

Example twelve may include the method of example ten, further comprising: receiving a list of peaks, the list of peaks including a third signal peak; determining that the third signal peak is associated with both the first potential active user device and the second potential active user device; determining a first summation of credits the first potential active user device has received from a signal peak friend set associated with the first potential active user device and a second summation of credits the second potential active user device has received from a signal peak friend set associated with second potential active user device; determining that the first summation of credits is a maximum credit allocation, a total power of the first potential active user device signal peak friend set is above a threshold, and the first active user device friend set has peaks of similar power values; and identifying the first potential active user device as owning the first signal peak.

Example thirteen may include the method of example twelve, further comprising receiving a list of peaks associated with the first potential active user device; and subtracting signals near a first peak of the list of peaks associated with the first potential active user device by signals near one or more other peaks of the list of peaks associated with the first potential active user device to remove fake peaks.

Example fourteen may include the method of example nine, wherein the plurality of symbol sequences comprise a pattern, and wherein the pattern is selected based on criteria including at least: that the pattern, after shifting by no more than a certain number of points, such as 15 points, to either the left or to the right, does not overlap with at most one sequence in any other pattern and that any two sequences in the pattern are separated by a minimum distance.

Example fifteen may include the method of example fourteen, wherein fake peaks may include at least one of side peaks or shoulder peaks.

Example sixteen may include the method of example nine, wherein the memory and processing circuitry are further configured to: decode a multiple bit message from the one or more potential active user devices based at least in part on the one or more signal peaks; and estimate a propagation delay associated with the one or more potential active user devices based at least in part on the one or more signal peaks.

Example seventeen may include a non-transitory computer-readable medium storing computer-executable instructions that, when executed by at least one processor, configure the at least one processor to perform operations comprising: receiving a signal comprising one or more symbol sequences on a physical random access channel (PRACH); identifying, based on the signal, a first potential active user device and a second potential active user device, wherein to identify the first potential active user device and the second potential active user device comprises: identifying and strengthening a first signal peak and a second signal peak within the signal; and associating the first signal peak to a first potential active user device and the second signal peak to a second potential active user device; and determining, using an Analog Bloom Filter (ABF), the first potential active user device is a first actual active user device and the second potential active user device is a second actual active user device from the one or more potential active user devices.

Example eighteen may include the non-transitory computer-readable medium of example seventeen further configured to perform operations comprising: receiving a threshold value; and performing a linear scan of the at least one signal, wherein the at least one signal comprises a signal vector comprising one or more indices, and wherein to perform the linear scan includes: determining that a value of a first scanned index of the one or more indices is higher than the threshold; determining a location of a jump is the value of the first scanned index based on the value of the first scanned index being at least one of (1) either more than three times larger than a value of a last scanned index or (2) more than five times a minimum value corresponding to the lowest value of any index of a set of indices between the index of a last jump and the last scanned index; and identifying the first signal peak, wherein the signal peak is a local maxima; receiving a list of peaks associated with the first potential active user device; and subtracting signals near a first peak of the list of peaks associated with the first potential active user device by signals near one or more other peaks of the list of peaks associated with the first potential active user device to remove fake peaks.

Example nineteen may include the non-transitory computer-readable medium of example seventeen further configured to perform operations comprising: decoding a multiple bit message from the one or more potential active user devices based at least in part on the one or more signal peaks; and estimating a propagation delay associated with the one or more potential active user devices based at least in part on the one or more signal peaks.

Example twenty may include the non-transitory computer-readable medium of example seventeen, wherein the plurality of symbol sequences comprise a pattern, and wherein the pattern is selected based on criteria including at least: that the pattern, after shifting by no more than a certain number of points, such as 15 points, to either the left or to the right, does not overlap with at most one sequence in any other pattern and that any two sequences in the pattern are separated by a minimum distance, and wherein a total of 2304 different patterns exist.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

It should also be understood that any references to any methods, device functionality, system functionality, or any other disclosure herein may be applicable to all methods, devices, systems, etc. For example, if the disclosure describes a method as involving particular steps involving certain functionality, the same functionality may be performed by a device described herein.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   receive a signal comprising one or more symbol sequences on a physical random access channel (PRACH);
   identify, based on the signal, a first potential active user device and a second potential active user device, wherein to identify the first potential active user device and the second potential active user device comprises:
      identify a first signal peak and a second signal peak within the signal; and
      associate the first signal peak to a first potential active user device and the second signal peak to a second potential active user device; and
      determine, using an Analog Bloom Filter (ABF), the first potential active user device is a first actual active user device and the second potential active user device is a second actual active user device from the one or more potential active user devices.

2. The device of claim 1, wherein to identify a first signal peak and a second signal peak within the signal further comprises:
   receive a threshold value; and
   perform a linear scan of the at least one signal, wherein the at least one signal comprises a signal vector comprising one or more indices, and wherein to perform the linear scan includes:
      determine that a value of a first scanned index of the one or more indices is higher than the threshold;
      determine a location of a jump is the value of the first scanned index based on the value of the first scanned index being at least one of (1) either more than three times larger than a value of a last scanned index or (2) more than five times a minimum value corresponding to the lowest value of any index of a set of indices between the index of a last jump and the last scanned index; and
      identify the first signal peak, wherein the signal peak is a local maxima.

3. The device of claim 2, wherein to identify one or more active user devices further comprises strengthening the signal peak.

4. The device of claim 2, wherein the device is further configured to:
   receive a list of peaks, the list of peaks including a third signal peak;
   determine that the third signal peak is associated with both the first potential active user device and the second potential active user device;
   determine a first summation of credits the first potential active user device has received from a signal peak friend set associated with the first potential active user device and a second summation of credits the second potential active user device has received from a signal peak friend set associated with second potential active user device;
   determine that the first summation of credits is a maximum credit allocation, a total power of the first potential active user device signal peak friend set is above a threshold, and the first active user device friend set has peaks of similar power values; and
   identify the first potential active user device as owning the first signal peak.

5. The device of claim 4, wherein the memory and processing circuitry are further configured to:
   receive a list of peaks associated with the first potential active user device; and
   subtract signals near a first peak of the list of peaks associated with the first potential active user device by signals near one or more other peaks of the list of peaks associated with the first potential active user device to remove fake peaks.

6. The device of claim 1, wherein the plurality of symbol sequences comprise a pattern, and wherein the pattern is selected based on criteria including at least: that the pattern, after shifting by no more than a certain number of points, such as 15 points, to either the left or to the right, does not overlap with at most one sequence in any other pattern and that any two sequences in the pattern are separated by a minimum distance.

7. The device of claim 6, wherein fake peaks may include at least one of side peaks or shoulder peaks.

8. The device of claim 1, wherein the memory and processing circuitry are further configured to:
   decode a multiple bit message from the one or more potential active user devices based at least in part on the one or more signal peaks; and estimate a propagation delay associated with the one or more potential active user devices based at least in part on the one or more signal peaks.

9. A method, comprising:

receiving a signal comprising one or more symbol sequences on a physical random access channel (PRACH);

identifying, based on the signal, a first potential active user device and a second potential active user device, wherein to identify the first potential active user device and the second potential active user device comprises:

identifying a first signal peak and a second signal peak within the signal; and associating the first signal peak to a first potential active user device and the second signal peak to a second potential active user device; and determining, using an Analog Bloom Filter (ABF), the first potential active user device is a first actual active user device and the second potential active user device is a second actual active user device from the one or more potential active user devices.

10. The method of claim 9, further comprising:

receiving a threshold value; and performing a linear scan of the at least one signal, wherein the at least one signal comprises a signal vector comprising one or more indices, and wherein to perform the linear scan includes:

determining that a value of a first scanned index of the one or more indices is higher than the threshold;

determining a location of a jump is the value of the first scanned index based on the value of the first scanned index being at least one of (1) either more than three times larger than a value of a last scanned index or (2) more than five times a minimum value corresponding to the lowest value of any index of a set of indices between the index of a last jump and the last scanned index; and identifying the first signal peak, wherein the signal peak is a local maxima.

11. The method of claim 10, wherein to identify one or more active user devices further comprises strengthening the signal peak.

12. The method of claim 10, further comprising:

receiving a list of peaks, the list of peaks including a third signal peak;

determining that the third signal peak is associated with both the first potential active user device and the second potential active user device;

determining a first summation of credits the first potential active user device has received from a signal peak friend set associated with the first potential active user device and a second summation of credits the second potential active user device has received from a signal peak friend set associated with second potential active user device;

determining that the first summation of credits is a maximum credit allocation, a total power of the first potential active user device signal peak friend set is above a threshold, and the first active user device friend set has peaks of similar power values; and identifying the first potential active user device as owning the first signal peak.

13. The method of claim 12, further comprising receiving a list of peaks associated with the first potential active user device; and subtracting signals near a first peak of the list of peaks associated with the first potential active user device by signals near one or more other peaks of the list of peaks associated with the first potential active user device to remove fake peaks.

14. The method of claim 9, wherein the plurality of symbol sequences comprise a pattern, and wherein the pattern is selected based on criteria including at least: that the pattern, after shifting by no more than a certain number of points, such as 15 points, to either the left or to the right, does not overlap with at most one sequence in any other pattern and that any two sequences in the pattern are separated by a minimum distance.

15. The method of claim 14, wherein fake peaks may include at least one of side peaks or shoulder peaks.

16. The method of claim 9, further comprising:

decoding a multiple bit message from the one or more potential active user devices based at least in part on the one or more signal peaks; and estimating a propagation delay associated with the one or more potential active user devices based at least in part on the one or more signal peaks.

17. A non-transitory computer-readable medium storing computer-executable instructions that, when executed by at least one processor, configure the at least one processor to perform operations comprising:

receiving a signal comprising one or more symbol sequences on a physical random access channel (PRACH);

identifying, based on the signal, a first potential active user device and a second potential active user device, wherein to identify the first potential active user device and the second potential active user device comprises:

identifying and strengthening a first signal peak and a second signal peak within the signal; and associating the first signal peak to a first potential active user device and the second signal peak to a second potential active user device; and determining, using an Analog Bloom Filter (ABF), the first potential active user device is a first actual active user device and the second potential active user device is a second actual active user device from the one or more potential active user devices.

18. The non-transitory computer-readable medium of claim 17 further configured to perform operations comprising:

receiving a threshold value; and performing a linear scan of the at least one signal, wherein the at least one signal comprises a signal vector comprising one or more indices, and wherein to perform the linear scan includes:

determining that a value of a first scanned index of the one or more indices is higher than the threshold;

determining a location of a jump is the value of the first scanned index based on the value of the first scanned index being at least one of (1) either more than three times larger than a value of a last scanned index or (2) more than five times a minimum value corresponding to the lowest value of any index of a set of indices between the index of a last jump and the last scanned index; and identifying the first signal peak, wherein the signal peak is a local maxima;

receiving a list of peaks associated with the first potential active user device; and subtracting signals near a first peak of the list of peaks associated with the first potential active user device by signals near one or more other peaks of the list of peaks associated with the first potential active user device to remove fake peaks.

19. The non-transitory computer-readable medium of claim 17 further configured to perform operations comprising:
   decoding a multiple bit message from the one or more potential active user devices based at least in part on the one or more signal peaks; and
   estimating a propagation delay associated with the one or more potential active user devices based at least in part on the one or more signal peaks.

20. The non-transitory computer-readable medium of claim 17, wherein the plurality of symbol sequences comprise a pattern, and wherein the pattern is selected based on criteria including at least: that the pattern, after shifting by no more than a certain number of points, such as 15 points, to either the left or to the right, does not overlap with at most one sequence in any other pattern and that any two sequences in the pattern are separated by a minimum distance, and wherein a total of 2304 different patterns exist.

* * * * *